US012601441B2

(12) United States Patent
Beeson

(10) Patent No.: US 12,601,441 B2
(45) Date of Patent: Apr. 14, 2026

(54) METHOD, DEVICE AND SYSTEM OF A HOSE RESTRAINT DEVICE INSTALLABLE ON A HOSE CARRYING A PRESSURIZED FLUID AND A FITTING THEREOF DURING OPERATION OF THE HOSE

(71) Applicant: Steve Beeson, Yukon, OK (US)

(72) Inventor: Steve Beeson, Yukon, OK (US)

( * ) Notice: Subject to any disclaimer, the term of this patent is extended or adjusted under 35 U.S.C. 154(b) by 421 days.

(21) Appl. No.: 18/222,954

(22) Filed: Jul. 17, 2023

(65) Prior Publication Data

US 2025/0027592 A1     Jan. 23, 2025

(51) Int. Cl.
*F16L 55/00*          (2006.01)
*F16L 35/00*          (2006.01)

(52) U.S. Cl.
CPC ............. *F16L 55/005* (2013.01); *F16L 35/00* (2013.01)

(58) Field of Classification Search
CPC ... Y10T 24/31; Y10T 24/314; Y10T 24/3439; Y10T 24/3487; F16L 3/02; F16L 57/02; F16L 57/005; F16L 35/00; F16L 55/005
USPC ........................................................ 138/106
See application file for complete search history.

(56) References Cited

U.S. PATENT DOCUMENTS

| | | | |
|---|---|---|---|
| 2,932,065 A | 4/1960 | Jenkins | |
| 3,172,178 A | * 3/1965 | Copell | A44C 5/2071 D2/639 |
| 3,197,240 A | 7/1965 | Lindberg | |

| | | | |
|---|---|---|---|
| 3,813,733 A | 6/1974 | Flohr | |
| 3,859,692 A | * 1/1975 | Waterman | F16L 55/005 285/117 |
| 4,549,332 A | * 10/1985 | Pouliot | F16L 55/005 24/129 R |
| 4,890,363 A | 1/1990 | Cross | |
| 5,066,049 A | 11/1991 | Staples | |
| 5,193,366 A | 3/1993 | Brinkman | |

(Continued)

FOREIGN PATENT DOCUMENTS

| | | |
|---|---|---|
| AU | 2013100199 A4 | 3/2013 |
| AU | 2013101651 A4 | 1/2014 |

(Continued)

OTHER PUBLICATIONS

US Trademark Registration No. 4452124; Mark—Whip Stop Filing date: Jul. 18, 2012 Registration date: Dec. 17, 2013.

(Continued)

*Primary Examiner* — Aaron M Dunwoody
(74) *Attorney, Agent, or Firm* — LegalForce RAPC Worldwide

(57)          ABSTRACT

Disclosed are a method, a device and/or a system of a hose restraint device installable on a hose carrying a pressurized fluid and a fitting thereof during operation of the hose. In accordance therewith, the hose restraint device includes a cable and link components that receive portions of the cable bent around the hose and the fitting. The link components each includes a slot through which the cable passes and a notched slot in which a bent portion of the cable is received. Based on loop-based connections of the hose restraint device to the hose and the fitting, the anchoring of the bent portions of the cable to the link components is supplemented by a restoring force of a spring surrounding the cable and expanding between the link components of the hose restraint device to then be solely delimited thereby.

20 Claims, 5 Drawing Sheets

(56) References Cited

U.S. PATENT DOCUMENTS

| | | | |
|---|---|---|---|
| 5,507,533 | A | 4/1996 | Mumma |
| 5,873,608 | A | 2/1999 | Tharp et al. |
| 6,481,457 | B2 | 11/2002 | Hayes et al. |
| 6,843,506 | B2 | 1/2005 | Osborne |
| 7,549,448 | B2 | 6/2009 | Ragner |
| 7,802,823 | B2 | 9/2010 | Piantoni |
| 8,172,271 | B2 | 5/2012 | Dixon |
| 8,905,081 | B2 | 12/2014 | Lee et al. |
| 9,717,381 | B2 | 8/2017 | Harman |
| 10,119,630 | B2 | 11/2018 | Harris et al. |
| 10,371,303 | B2 | 8/2019 | Bosis et al. |
| 10,480,703 | B2 * | 11/2019 | Gamba ................... F16G 11/14 |
| 10,697,576 | B1 | 6/2020 | Skoog |
| 11,512,806 | B1 | 11/2022 | Bond et al. |
| 2004/0108715 | A1 * | 6/2004 | Surjaatmadja ........ F16L 55/005 285/114 |
| 2005/0241348 | A1 * | 11/2005 | Devecki .............. E05B 73/0005 70/58 |
| 2008/0040898 | A1 * | 2/2008 | Stolk ..................... B60P 7/0838 24/298 |
| 2010/0059636 | A1 | 3/2010 | McClanahan et al. |
| 2015/0192233 | A1 | 7/2015 | Meadows et al. |
| 2016/0312918 | A1 | 10/2016 | Teel |
| 2017/0191588 | A1 | 7/2017 | Edwards |
| 2019/0063659 | A1 * | 2/2019 | Gamba ................... F16G 11/14 |
| 2023/0243453 | A1 | 8/2023 | Uhryn |
| 2023/0408017 | A1 * | 12/2023 | Baumgartner ........ F16L 55/005 |

FOREIGN PATENT DOCUMENTS

| | | | |
|---|---|---|---|
| AU | 2021106744 | A4 | 11/2021 |
| CA | 2957167 | C | 9/2019 |
| CN | 106195493 | A | 12/2016 |
| CN | 110260085 | A | 9/2019 |
| EP | 3816496 | A1 | 5/2021 |
| GB | 2439550 | A | 1/2008 |
| JP | 2012017823 | A | 1/2012 |
| KR | 20180113273 | A | 10/2018 |
| WO | 2006002459 | A1 | 1/2006 |

OTHER PUBLICATIONS

US Trademark Registration No. 4441630; Mark—Red Iron Slings Filing date: Jan. 17, 2013 Registration date: Nov. 26, 2013.

"Use of Whip Checks (Hose Restraints)" Published by The International Marine Contractors Association, Published Online on [Jul. 2020] https://www.trauma-training.org/wp-content/uploads/2020/09/IMCA-D-065-Publication-464-Guidance-on-the-use-of-Whip-Checks-Hose-Restraints.pdf.

"Hose Whip Restraint" by Parker, Found Online on [Aug. 28, 2023] https://www.comoso.com/uploads/products/downloads/Parker_Comoso_Hose_Whip_Restraint_4480_B148.pdf.

"Standards and regulations for hose restraints" by Chicago Coupling, Published Online on [Feb. 8, 2017] http://www.meridianeng.com/Whip%20checks.pdf.

"Whip Checks" by Hydroblast, Found Online on [Aug. 28, 2023] https://www.hydroblast.co.uk/wp-content/uploads/2019/02/Hydroblast-Whip-Check.pdf.

"Compressed Air Hose—Whip Checks Best Practices" by Municipal Excess Liability Joint Insurance Fund, Found Online on [Aug. 28, 2023] https://melsafetyinstitute.org/wp-content/uploads/2023/07/MSI-Shift-Briefing-Compressed-Air-Hose-Whip-Checks-Best-Practices.pdf.

"Whip Checks (Air hose safety cables)" Published on Victorian Electricity Supply Industry, found Online on [Aug. 28, 2023] http://www.vesi.com.au/files/VEDNCivilWorks/News/Whip_Checks.pdf.

"King Safety Cable" by Dixon Valve & Coupling Co., Found Online on [Aug. 28, 2023] https://www.dixonvalve.com/sites/default/files/downloadable_resources/product_literature/KingSafetyCable_2015.pdf.

"Whip Socks" by Slings And Supplies, Found Online on [Aug. 28, 2023] https://www.slingsandsupplies.co.za/wp-content/uploads/2021/02/Whip-Socks-Product-Guide.pdf.

"Air Pressure Fittings: Whipchecks" by Action Sealtite, Found Online on [Aug. 28, 2023] https://www.actionsealtite.com/media/3420/asi-air-pressure-fittings-whipcheck-datasheet-aug-2017.pdf.

"Salva-Vida Whip Check Safety Sling" by Shutterlock, Found Online on [Aug. 28, 2023] https://shutterlock.co.za/wp-content/uploads/2017/11/0.139-SLock-Cat-9th-E-Pg.130-Salva-Vida-Whip-Checks.pdf.

"Risks associated with pneumatic hose couplings" by National Offshore Petroleum Safety and Environmental Management Authority, Published Online on [May 30, 2018] https://www.nopsema.gov.au/sites/default/files/documents/2021-03/A296017.pdf.

"Safety Bulletin Hose-Whipping" Published by American Concrete Pumping Association, Published Online on [Jan. 2010] https://www.concretepumpers.com/sites/concretepumpers.com/files/attachments/safety_bulletin_hosewhip_web.pdf.

"Whip Stop Hose Restraint" by Safby, Published Online on [Oct. 6, 2020] https://m.media-amazon.com/images/1/61m7FK46b2L._SX38_.jpg.

"10 of WC-1 Cable Hose Restraints" by American Iron Works, Published Online on [Oct. 2, 2015] https://images-cdn.ubuy.co.in/6351c257a5ea446ff82ec35e-50-of-wc-1-cable-hose-restraints-whip.jpg.

"WeighTAJ Whip Check—Hose Safety Cable Choker Compressed Air Restraint Whipcheck" by WeighTAJ, Published Online on [Oct. 6, 2021] https://m.media-amazon.com/images/1/31vO-ACKBNL._SY445_SX342_QL70_FMwebp_.jpg.

"200 PSI 1/8inch X 20-1/4inch Hose Restraints" by LKS, Found Online on [Aug. 28, 2023] https://m.media-amazon.com/images/1/71n+IZvTEJL._AC_SY355_.jpg.

"20 of WC-4 Cable Hose Restraints" by American Iron Works, Found Online on [Aug. 28, 2023] https://m.media-amazon.com/images/1/71324ePouxL.jpg.

"WC-1 Cable Hose Restraint" by AIW, Published Online on [Sep. 10, 2015] https://m.media-amazon.com/images/1/31606pPuzFL._AC_.jpg.

"JAVIKA 200 PSI 1/8inch X 20-1/4inch Hose Restraints" by Javika, Published Online on [Sep. 27, 2022] https://m.media-amazon.com/images/1/719tadRmIEL._AC_SX425_. jpg.

"Hose Whip Restraint System" by U-Safe, Found Online on [Aug. 28, 2023] https://5.imimg.com/data5/ME/AV/OT/SELLER-11195877/whip-check-safety-cable-whip-lash-1000x1000.jpg.

"Minsup Whipchecks" by Minsup, Found Online on [Aug. 28, 2023] https://hosefactory.com.au/cdn/shop/products/ScreenShot2021-09-17at4.31.40pm_5000x.png?v=1641216431.

"Indian Whip Check Safety Cable" by Generic, Published Online on [Jun. 4, 2019] https://m.media-amazon.com/images/1/414LmuK3DkL.jpg.

* cited by examiner

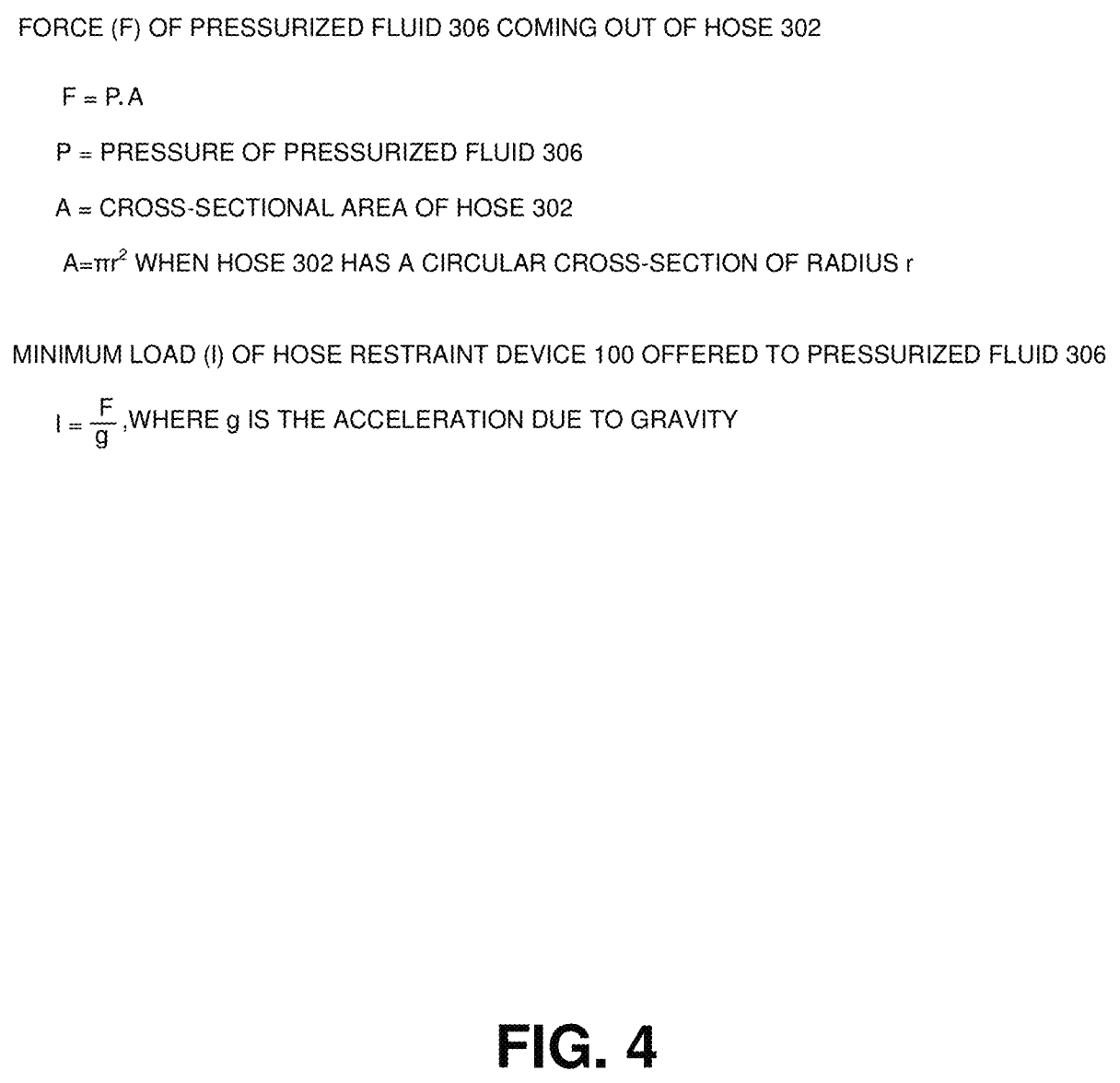

FORCE (F) OF PRESSURIZED FLUID 306 COMING OUT OF HOSE 302

F = P.A

P = PRESSURE OF PRESSURIZED FLUID 306

A = CROSS-SECTIONAL AREA OF HOSE 302

$A = \pi r^2$ WHEN HOSE 302 HAS A CIRCULAR CROSS-SECTION OF RADIUS r

MINIMUM LOAD (l) OF HOSE RESTRAINT DEVICE 100 OFFERED TO PRESSURIZED FLUID 306

$l = \dfrac{F}{g}$, WHERE g IS THE ACCELERATION DUE TO GRAVITY

FIG. 4

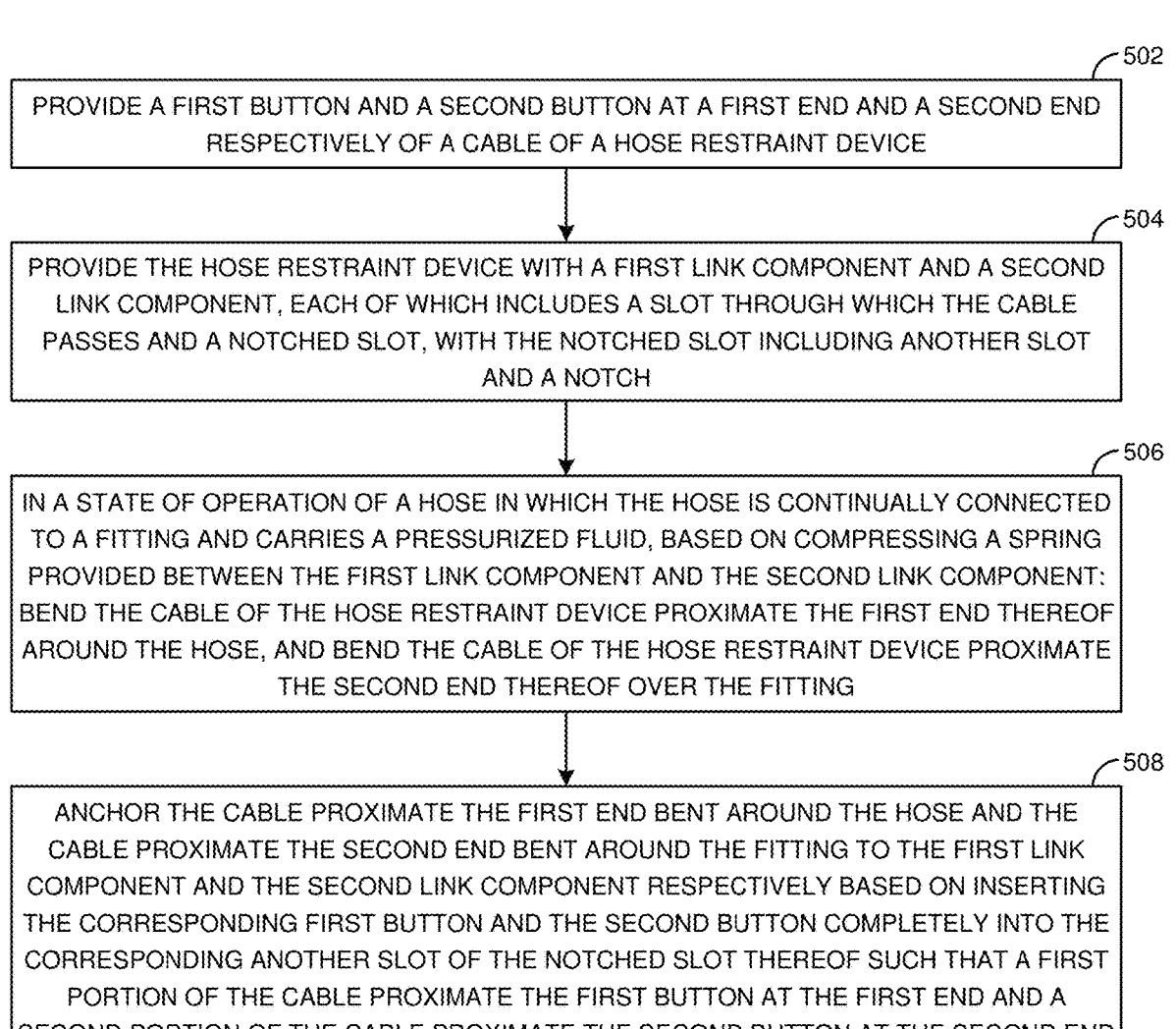

502

PROVIDE A FIRST BUTTON AND A SECOND BUTTON AT A FIRST END AND A SECOND END RESPECTIVELY OF A CABLE OF A HOSE RESTRAINT DEVICE

504

PROVIDE THE HOSE RESTRAINT DEVICE WITH A FIRST LINK COMPONENT AND A SECOND LINK COMPONENT, EACH OF WHICH INCLUDES A SLOT THROUGH WHICH THE CABLE PASSES AND A NOTCHED SLOT, WITH THE NOTCHED SLOT INCLUDING ANOTHER SLOT AND A NOTCH

506

IN A STATE OF OPERATION OF A HOSE IN WHICH THE HOSE IS CONTINUALLY CONNECTED TO A FITTING AND CARRIES A PRESSURIZED FLUID, BASED ON COMPRESSING A SPRING PROVIDED BETWEEN THE FIRST LINK COMPONENT AND THE SECOND LINK COMPONENT: BEND THE CABLE OF THE HOSE RESTRAINT DEVICE PROXIMATE THE FIRST END THEREOF AROUND THE HOSE, AND BEND THE CABLE OF THE HOSE RESTRAINT DEVICE PROXIMATE THE SECOND END THEREOF OVER THE FITTING

508

ANCHOR THE CABLE PROXIMATE THE FIRST END BENT AROUND THE HOSE AND THE CABLE PROXIMATE THE SECOND END BENT AROUND THE FITTING TO THE FIRST LINK COMPONENT AND THE SECOND LINK COMPONENT RESPECTIVELY BASED ON INSERTING THE CORRESPONDING FIRST BUTTON AND THE SECOND BUTTON COMPLETELY INTO THE CORRESPONDING ANOTHER SLOT OF THE NOTCHED SLOT THEREOF SUCH THAT A FIRST PORTION OF THE CABLE PROXIMATE THE FIRST BUTTON AT THE FIRST END AND A SECOND PORTION OF THE CABLE PROXIMATE THE SECOND BUTTON AT THE SECOND END AUTOMATICALLY MOVE INTO THE CORRESPONDING NOTCH OF THE NOTCHED SLOT OF THE FIRST LINK COMPONENT AND THE SECOND LINK COMPONENT RESPECTIVELY

510

FORM A FIRST LOOP-BASED CONNECTION OF THE HOSE RESTRAINT DEVICE AROUND THE HOSE PROXIMATE THE FIRST END OF THE CABLE AND A SECOND LOOP-BASED CONNECTION OF THE HOSE RESTRAINT DEVICE AROUND THE FITTING PROXIMATE THE SECOND END OF THE CABLE BASED ON THE ANCHORING OF THE CABLE PROXIMATE THE FIRST END THEREOF AND THE SECOND END THEREOF TO THE CORRESPONDING FIRST LINK COMPONENT AND THE SECOND LINK COMPONENT IN ACCORDANCE WITH A RESTORING FORCE OF THE SPRING EXPANDING THE SPRING SUCH THAT THE SPRING IS THEN SOLELY DELIMITED BY THE FIRST LINK COMPONENT AND THE SECOND LINK COMPONENT OF THE HOSE RESTRAINT DEVICE

FIG. 5

METHOD, DEVICE AND SYSTEM OF A HOSE RESTRAINT DEVICE INSTALLABLE ON A HOSE CARRYING A PRESSURIZED FLUID AND A FITTING THEREOF DURING OPERATION OF THE HOSE

FIELD OF TECHNOLOGY

This disclosure relates generally to hose restraint devices and, more particularly, to a method, a device and/or a system of a hose restraint device installable on a hose carrying a pressurized fluid and a fitting thereof during operation of the hose.

BACKGROUND

A hose restraint device may be a device directly coupled to a hose carrying a pressurized fluid (e.g., liquid and/or gas) and a fitting thereof for the purpose of preventing a whip effect when the hose separates from the fitting and/or breaks connection therefrom due to the high pressure level of the fluid carried therethrough. The high pressure level of the fluid may cause movement of the hose, which, in turn, may also cause the fitting to detach and/or separate. The whip effect may cause serious injuries to a user associated with the hose and/or personnel in a vicinity thereof; the unpredictability of the whip effect may cause the fluid carried through the hose to be spilled on to the user. Pressurized hoses may, for example, be employed in injection moulding and heavy hydraulic and/or pneumatic presses may be dangerous to personnel in the vicinity of the hose if the hose separates from the fitting and travels out to strike said personnel.

Typical hose restraint devices may require interruption in the hose connection for installation thereof. In other words, the hose may have to be disconnected from the fitting thereof in order for a typical hose restraint device to be installed thereon. Organizations may be hesitant to install these hose restraint devices because equipment may have to be shut down therefor, the fluid supply disconnected and existing fluid in the hose drained prior to installation. Thus, the possibility of contaminants entering the system, environmental issues being aggravated due to the leakage of the fluid and/or system downtime may be increased upon installation of these typical hose restraint devices.

SUMMARY

Disclosed are a method, a device and/or a system of a hose restraint device installable on a hose carrying a pressurized fluid and a fitting thereof during operation of the hose.

In one aspect, a method of a coupling a hose restraint device to a hose carrying a pressurized fluid and a fitting thereof is disclosed. The method includes providing a first button and a second button at a first end and a second end respectively of a cable of the hose restraint device, and providing the hose restraint device with a first link component and a second link component, each of which includes a slot through which the cable passes and a notched slot. The notched slot includes another slot and a notch. The method also includes, in a state of operation of the hose in which the hose is continually connected to the fitting and carries the pressurized fluid, based on compressing a spring provided between the first link component and the second link component, bending the cable of the hose restraint device proximate the first end thereof around the hose, and bending the cable of the hose restraint device proximate the second end thereof over the fitting.

Further, the method includes, in the state of operation of the hose, anchoring the cable proximate the first end bent around the hose and the cable proximate the second end bent around the fitting to the first link component and the second link component respectively based on inserting the corresponding first button and the second button completely into the corresponding another slot of the notched slot thereof such that a first portion of the cable proximate the first button at the first end and a second portion of the cable proximate the second button at the second end automatically move into the corresponding notch of the notched slot of the first link component and the second link component respectively. Still further, the method includes, in the state of operation of the hose, forming a first loop-based connection of the hose restraint device around the hose proximate the first end of the cable and a second loop-based connection of the hose restraint device around the fitting proximate the second end of the cable based on the anchoring of the cable proximate the first end thereof and the second end thereof to the corresponding first link component and the second link component in accordance with a restoring force of the spring expanding the spring such that the spring is then solely delimited by the first link component and the second link component of the hose restraint device.

In another aspect, a hose restraint device couplable to a hose carrying a pressurized fluid and a fitting thereof is disclosed. The hose restraint device includes a cable, a first button and a second button at a first end and a second end respectively of the cable, and a first link component and a second link component, each of which includes a slot through which the cable passes and a notched slot. The notched slot includes another slot and a notch. The hose restraint device also includes a spring provided between the first link component and the second link component. In a state of operation of the hose in which the hose is continually connected to the fitting and carries the pressurized fluid, the spring is compressed to bend the cable proximate the first end around the hose and the cable proximate the second end around the fitting.

Also, in the state of operation of the hose, the cable proximate the first end bent around the hose and the cable proximate the second end bent around the fitting are anchored to the first link component and the second link component respectively based on inserting the corresponding first button and the second button completely into the corresponding another slot of the notched slot thereof such that a first portion of the bent cable proximate the first button at the first end and a second portion of the bent cable proximate the second button at the second end automatically move into the corresponding notch of the notched slot of the first link component and the second link component respectively. Further, in the state of operation of the hose, a first loop-based connection around the hose proximate the first end of the cable and a second loop-based connection around the fitting proximate the second end of the cable are formed based on the anchoring of the bent cable proximate the first end and the second end to the corresponding first link component and the second link component in accordance with a restoring force of the spring expanding the spring such that the spring is then solely delimited by the first link component and the second link component.

In yet another aspect, a hose restraint system is disclosed. The hose restraint system includes a hose carrying a pressurized fluid, a fitting of the hose, and a hose restraint device. The hose restraint device includes a cable, a first button and a second button at a first end and a second end respectively of the cable, and a first link component and a second link component, each of which includes a slot through which the cable passes and a notched slot. The notched slot includes another slot and a notch. The hose restraint device also includes a spring provided between the first link component and the second link component. In a state of operation of the hose in which the hose is continually connected to the fitting and carries the pressurized fluid, the spring of the hose restraint device is compressed to bend the cable proximate the first end around the hose and the cable proximate the second end around the fitting.

Also, in the state of operation of the hose, the cable proximate the first end bent around the hose and the cable proximate the second end bent around the fitting are anchored to the first link component and the second link component respectively based on inserting the first button and the second button completely into the corresponding another slot of the notched slot thereof such that a first portion of the bent cable proximate the first button at the first end and a second portion of the bent cable proximate the second button at the second end automatically move into the corresponding notch of the notched slot of the first link component and the second link component respectively. Further, in the state of operation of the hose, a first loop-based connection proximate the first end of the cable and a second loop-based connection proximate the second end of the cable are formed based on the anchoring of the bent cable proximate the first end and the second end to the corresponding first link component and the second link component in accordance with a restoring force of the spring expanding the spring such that the spring is then solely delimited by the first link component and the second link component of the hose restraint device.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 4 is a mathematical formulation of design considerations pertaining to the hose restraint device of FIGS. 1-3, according to one or more embodiments.

FIG. 5 is a process flow diagram detailing the operations involved in coupling a hose restraint device to a hose carrying a pressurized fluid and a fitting thereof, according to one or more embodiments.

Other features of the present embodiments will be apparent from the accompanying drawings and from the detailed description that follows.

DETAILED DESCRIPTION

Example embodiments, as described below, may be used to provide a method, a device and/or a system of a hose restraint device installable on a hose carrying a pressurized fluid and a fitting thereof during operation of the hose.

Although the present embodiments have been described with reference to specific example embodiments, it will be evident that various modifications and changes may be made to these embodiments without departing from the broader spirit and scope of the various embodiments.

Figure 1:
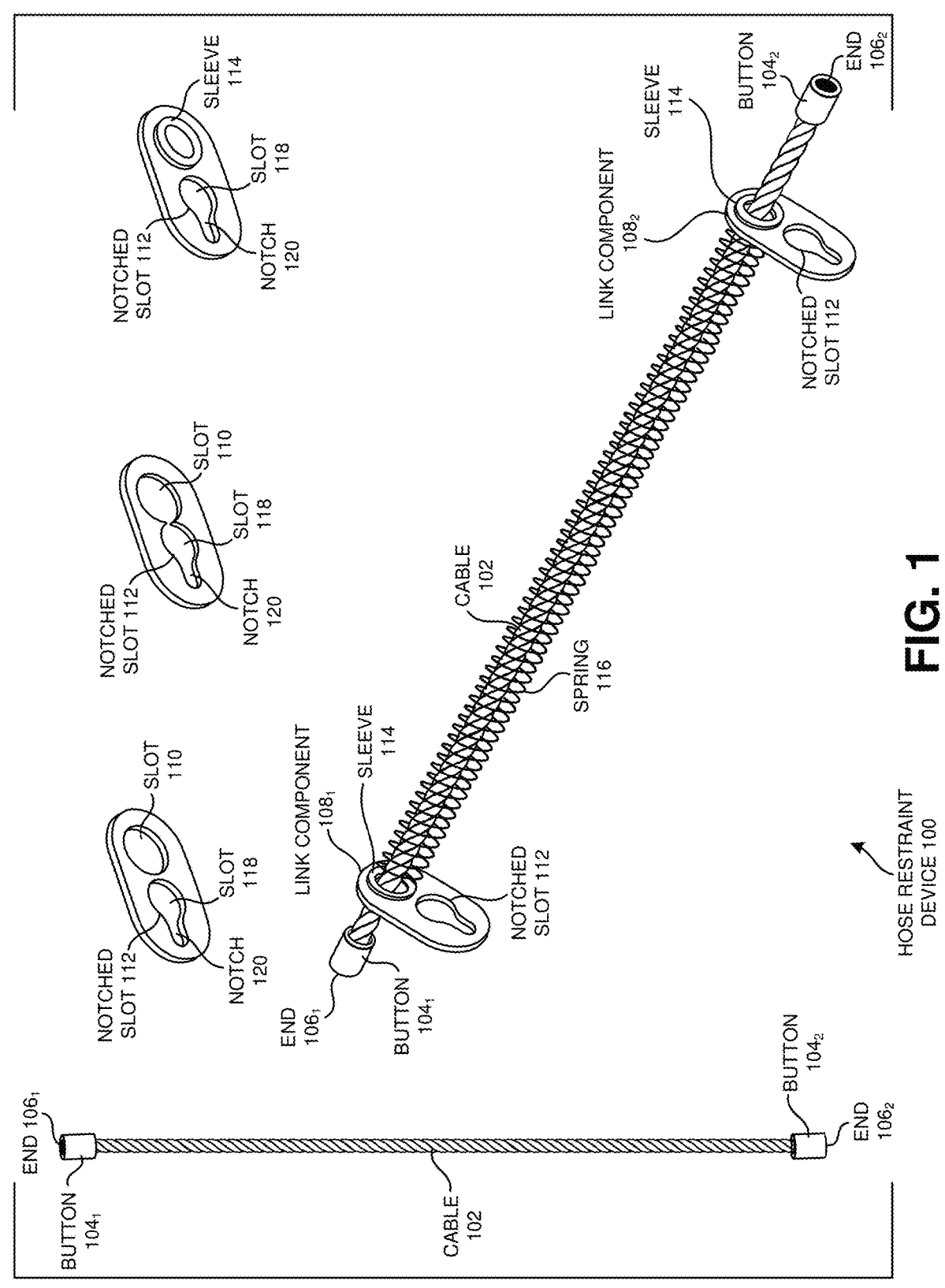
FIG. 1 is an illustrative view of a hose restraint device, according to one or more embodiments.

FIG. 1 shows a hose restraint device 100, according to one or more embodiments. In one or more embodiments, hose restraint device 100, as discussed herein, may refer to a device directly coupled to a hose carrying a pressurized fluid (e.g., liquid and/or gas) and a fitting thereof for the purpose of preventing a whip effect when the hose separates from the fitting and/or breaks connection therefrom due to the high pressure level of the fluid carried therethrough. The high pressure level of the fluid may cause movement of the hose, which, in turn, may also cause the fitting to detach and/or separate. The whip effect may cause serious injuries to a user associated with the hose and/or personnel in a vicinity thereof, the unpredictability of the whip effect may cause the fluid carried through the hose to be spilled on to the user. Pressurized hoses may, for example, be employed in injection moulding and heavy hydraulic and/or pneumatic presses may be dangerous to personnel in the vicinity of the hose if the hose separates from the fitting and travels out to strike said personnel.

Typical hose restraint devices may require interruption in the hose connection for installation thereof. In other words, the hose may have to be disconnected from the fitting thereof in order for a typical hose restraint device to be installed thereon. Organizations may be hesitant to install these hose restraint devices because equipment may have to be shut down therefor, the fluid supply disconnected and existing fluid in the hose drained prior to installation. Thus, the possibility of contaminants entering the system, environmental issues being aggravated due to the leakage of the fluid and/or system downtime may be increased upon installation of these typical hose restraint devices. Exemplary embodiments at least in the form of hose restraint device 100 discussed herein may reduce the occurrences of the whip effect based on hose restraint device 100 holding on to the hose and the fitting thereof even when the hose carrying a highly pressurized fluid separates from the fitting. Further, in one or more embodiments, hose restraint device 100 may be installed on the hose and the fitting thereof without disconnecting the hose carrying the highly pressurized fluid. Exemplary embodiments, as typified at least by hose restraint device 100, may be advantageously employed in industries and large scale industrial plants through integration thereof on to existing hoses and equipment.

Referring back to FIG. 1, in one or more embodiments, hose restraint device 100 may include a bendable cable 102 and buttons 104$_{1-2}$ at ends 106$_{1-2}$ thereof. In one or more embodiments, cable 102 may be made of a metallic material such as aluminium, copper, steel, stainless steel, an alloy and/or a composite. In some embodiments, cable 102 may be made of a corrosion-resistant material that provides for high tensile strength. In one or more embodiments, buttons 104$_{1-2}$ may also be made of metallic material (e.g., steel, stainless steel, coated steel, aluminium, copper, an alloy, a composite). In one or more embodiments, each button 104$_{1-2}$ may be cylindrical in shape in correspondence with a shape of cable 102 and may have a higher cross-sectional diameter than cable 102. However, the cylindrical shape of buttons 104$_{1-2}$ should not be considered limiting and that other shapes such as that of a rectangular prism and a cuboid are within the scope of the exemplary embodiments discussed herein. In one or more embodiments, a length of each button 104$_{1-2}$ may be significantly smaller than a length of cable 102 to enable limitation of the presence of buttons $104_{1-2}$ at ends $106_{1-2}$ of cable 102. In one or more embodiments, a portion of cable 102 proximate each end $106_{1-2}$ thereof may pass through a corresponding button $104_{1-2}$ and be held therethrough until said each end $106_{1-2}$.

In one or more embodiments, cable 102 may include a number of sub-cables twisted into one another. In addition to the aforementioned components, in one or more embodiments, hose restraint device 100 may include two link components $108_{1-2}$ to be utilized for anchoring cable 102 proximate each end $106_{1-2}$ thereto following establishment of loop-based connections to the hose and the fitting thereof, as will be discussed below. In one or more embodiments, each link component $108_{1-2}$ may also be made of a metallic material (e.g., steel, coated steel, aluminium, copper, stainless steel, an alloy, a composite). As shown in FIG. 1, in one or more embodiments, a link component $108_{1-2}$ may include a slot 110 and a notched slot 112 adjacent to each other. In some embodiments, slot 110 and notched slot 112 may be non-continuous and/or contiguous and, in some other embodiments, slot 110 and notched slot 112 may touch each other and, optionally, even share a minimal common portion. FIG. 1 shows both non-continuous and continuous slot/notched slot embodiments of link components $108_{1-2}$, according to one or more embodiments.

In one or more embodiments, a dimensional length of each link component $108_{1-2}$ may again be significantly small than that of cable 102. In one or more embodiments, cable 102 may be passed through slot 110 of each link component $108_{1-2}$. In one or more embodiments, for a smooth and/or a stable passage of cable 102 through slot 110, slot 110 of each link component $108_{1-2}$ may include a sleeve 114 (e.g., a polyester sleeve) provided therein. In one example embodiment, sleeve 114 may be a ring placed within slot 110 and cable 102 may pass through sleeve 114 of slot 110. In one or more embodiments, link component $108_1$ may be associated with anchoring cable 102 proximate end $106_1$ and link component $108_2$ may be associated with anchoring cable 102 proximate end $106_2$ following formation of the loop-based connections discussed above.

In one or more embodiments, in a state of cable 102 passing through slot 110/sleeve 114 of each link component $108_{1-2}$, a spring 116 (e.g., made of metallic material such as steel, stainless steel, copper, coated steel, aluminium, an alloy and a composite) may be provided between link component $108_1$ and link component $108_2$. In one or more embodiments, spring 116 may encompass a significant portion of cable 102 therein; in other words, a significant portion/length of cable 102 may pass through spring 116 and be encompassed thereby. In one or more embodiments, spring 116 may be compressed (e.g., held to a compressed state using common tools such as pliers, using link component $108_{1-2}$) to reveal an appropriate length of cable 102 to go over a hose at end $106_1$ and a fitting thereof at end $106_2$, as will be discussed below. In one or more embodiments, once the loop-based connection of cable 102 is made, a restoring force of spring 116 may enable spring 116 to expand back enough to be delimited solely by link components $108_{1-2}$ as boundaries thereof.

Figure 2:
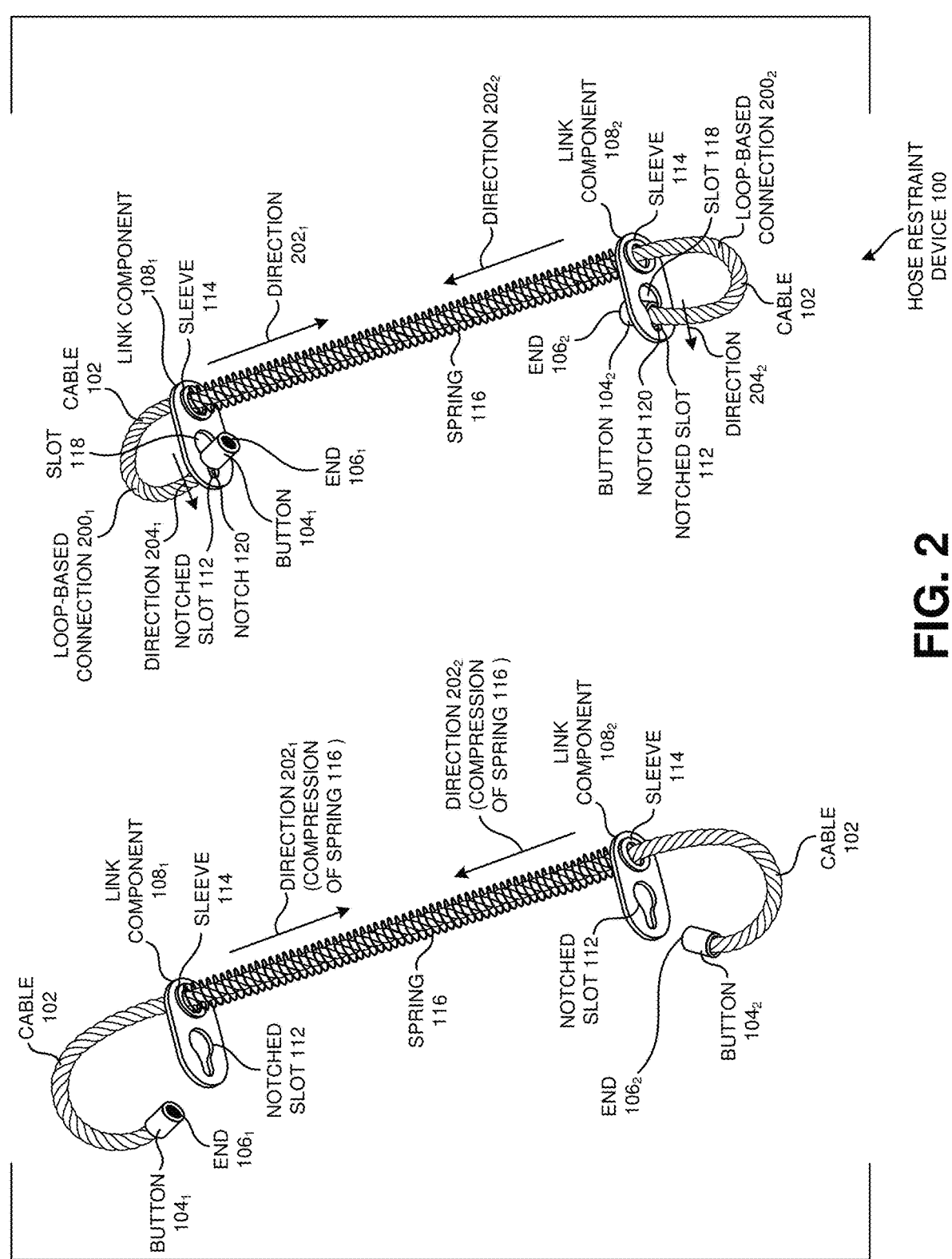
FIG. 2 is an illustrative view of loop-based connections being made using the hose restraint device of FIG. 1, according to one or more embodiments.

FIG. 2 shows loop-based connections $200_{1-2}$ being made proximate end $106_1$ and end $106_2$ of cable 102 of hose restraint device 100, according to one or more embodiments. In one or more embodiments, as discussed above, cable 102 may pass through slot 110 of each link component $108_{1-2}$ and a compressible spring 116 may be provided between link component $108_1$ and link component $108_2$. In one or more embodiments, in order for loop-based connections $200_{1-2}$ to be made, an appropriate length of cable 102 at one end $106_{1-2}$ may be revealed as per a requirement of said length to completely go over a hose or a fitting thereof based on compression of spring 116 in a direction $202_{1-2}$ toward the other end $106_{1-2}$. In one or more embodiments, this compression of spring 116 may be accomplished based on depressing link component $108_{1-2}$ along direction $202_{1-2}$, holding link component $108_{1-2}$ to keep spring 116 compressed in direction $202_{1-2}$ and/or utilizing a common tool such as pliers to keep spring 116 compressed in direction $202_{1-2}$.

In one or more embodiments, the compression of spring 116 may render it possible for the appropriate length of cable 102 at end $106_{1-2}$ to emerge out of slot 110 of link component $108_{1-2}$. In one or more embodiments, the appropriate lengths of cable 102 may be bent over the hose (not shown in FIG. 2) proximate end $106_1$ and the fitting (not shown in FIG. 2) proximate end $106_2$ to go over the hose and the fitting to form a first loop covering the hose and a second loop covering the fitting. In one or more embodiments, following the formation of the loops, button $104_{1-2}$ at end $106_{1-2}$ may be inserted into notched slot 112. Referring back to FIG. 1, notched slot 112 may include a slot (e.g., slot 118) continuous with a notch (e.g., notch 120) at a lateral side thereof, with slot 118 having a cross-sectional diameter larger than that of button $104_{1-2}$ at end $106_{1-2}$ and notch 120 having a thickness/width lesser than the cross-sectional diameter of button $104_{1-2}$ at end $106_{1-2}$ but more than the cross-sectional diameter of cable 102. It should be noted that the shapes of slot 110 and notched slot 112 are not limiting and that cross-sectional diameters may be generalized to cross-sectional dimensions.

In one or more embodiments, insertion of button $104_{1-2}$ at end $106_{1-2}$ completely into slot 118 of notched slot 112 of a corresponding link component $108_{1-2}$ may cause a portion of cable 102 of the loop formed to automatically move in a direction $204_{1-2}$, approximately perpendicular to direction $202_{1-2}$ and be received within notch 120, thus forming loop-based connection $200_{1-2}$ at a corresponding end $106_{1-2}$. In one or more embodiments, the bending of cable 102 may provide a restoring force along direction $204_{1-2}$ to enable the portion of cable 102 of the loop formed to be received within notch 120. In this state, in one or more embodiments, cable 102 proximate end $106_{1-2}$ may be anchored within link component $108_{1-2}$ as discussed above. In one or more embodiments, the relative dimensions of button $104_{1-2}$, cable 102, slot 110, slot 118 and notch 120 and the restoring force of the bent portion of cable 102 may make it possible for the anchoring to be robust and stable such that cable 102 and button $104_{1-2}$ do not pop out of link component $108_{1-2}$ (slot 110 and notched slot 112 (slot 118 and notch 120)).

Figure 3:
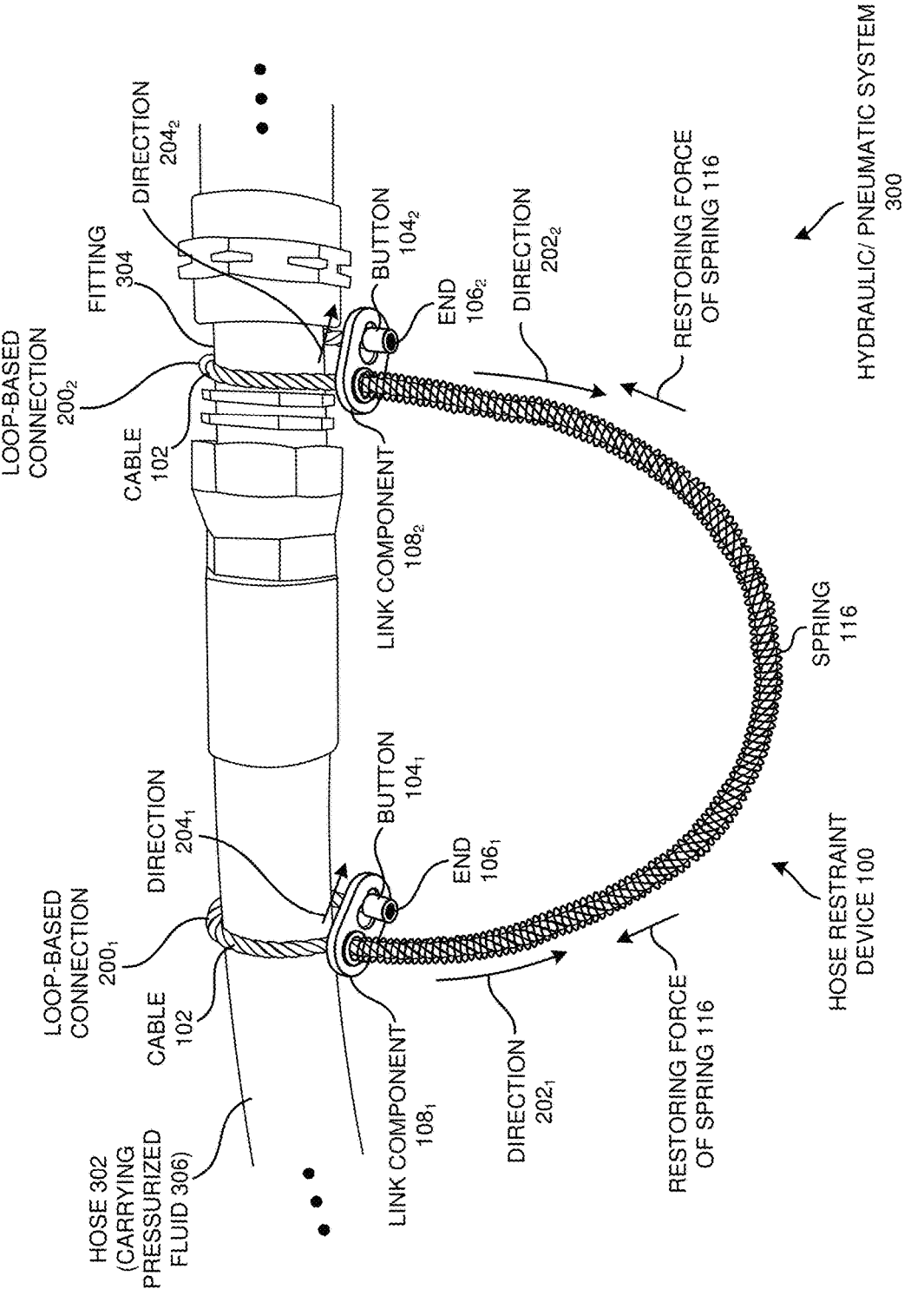
FIG. 3 is an illustrative view of example loop-based connections formed around a hose and a fitting thereof in a hydraulic/pneumatic system using the hose restraint device of FIGS. 1-2.

FIG. 3 shows example loop-based connections $200_{1-2}$ formed around a hose 302 and a fitting 304 of hose 302 using hose restraint device 100. In one or more embodiments, hose 302 may be part of a hydraulic/pneumatic system 300 and may be carrying a pressurized fluid therethrough. In one example scenario, hose 302 may be coupled to a Joint Industry Council (JIC) fitting. The JIC fitting may have a threaded port on another side thereof to which a hydraulic block may be screwed. Fitting 304 here may be part of the hydraulic block. Loop-based connection $200_1$ may be formed around hose 302 based on a portion of cable 102 proximate end $106_1$ going around hose 102 and said portion being anchored at link component $108_1$. Loop-based connection $200_2$ may be formed around fitting 304 based on a portion of cable 102 proximate end $106_2$ going around fitting 304 and said portion being anchored at link component $108_2$.

In FIG. 3, although cable 102 of hose restraint device 100 is curved and bent in a state of connection to hose 302 and fitting 304, direction $202_{1-2}$ may be shown as being along the approximate unbent portions of cable 102. Once loop connections $200_{1-2}$ are made, portions of cable 102 proximate end $106_1$ and end $106_2$ may hold on to hose 302 and fitting 304 respectively.

In one or more embodiments, the mechanism of coupling/connection of hose restraint device 100 to hose 302 and fitting 304 may make it possible for hose restraint device 100 to be connected to/installed on hose 302 and fitting 304 in a state of operation (e.g., operational state 350) of hose 302 in which a pressurized fluid (e.g., pressurized fluid 306) is carried via hose 302 and hose 302 continues to be attached to fitting 304 without the need to remove/disconnect hose 302 from fitting 304. In other words, in one or more embodiments, hose restraint device 100 may be connected/coupled to hose 302 and fitting 304 or installed thereon during the state of operation thereof. In one or more embodiments, as equipment need not be shut down, supply of pressurized fluid 306 need not be disconnected and hose 302 need not be drained prior to installing hose restraint device 100 on hose 302 and fitting 304, hydraulic/pneumatic system 300 may have advantages pertaining to continued and uninterrupted operation of hose 302 and increased safety arising out of reduced leaks of pressurized fluid 306.

It should be noted that, in some embodiments, fitting 304 may be part of a split flange based coupling, where port-hose 302 connections and/or hose-hose (analogous to hose 302) connections may be made. Here, hose restraint device 100, as discussed above, may be installed on hose 302 and fitting 304 based on loop-based connections $200_{1-2}$ without breaking connection between hose 302 and fitting 304. All possible types of fitting 304 and coupling thereof are within the scope of the exemplary embodiments discussed herein.

FIG. 4 shows design considerations pertaining to hose restraint device 100, according to one or more embodiments. In one or more embodiments, a force (F) of pressurized fluid 306 coming out of hose 302 may be related to a cross-sectional area (A) of hose 302 and pressure (P) of pressurized fluid 306 as:

$$F = P \cdot A$$

In one or more embodiments, in the case of a circular cross-section of hose 302, $A = \pi r^2$, where r is the cross-sectional radius of hose 302. Thus, in one or more embodiments, the minimum load (l) of hose restraint device 100 offered to pressurized fluid 306 may be calculated as:

$$l = \frac{F}{g},$$

where g is the acceleration due to gravity.

In one or more embodiments, the aforementioned minimum load may have to be scaled by a factor to realize a desired load offered by hose restraint device 100. In one or more embodiments, all components of hose restraint device 100 discussed above may have to be designed such that the aforementioned minimum load is met by hose restraint device 100. In one example implementation, hose restraint device 100 may hold on to hose 302 and fitting 304 even when the connection between hose 302 and fitting 304 breaks at 8200 Pounds Per Square Inch (PSI). Thus, not only may hose restraint device 100 hold onto hose 302 and fitting 304 into a stable mode of operation (e.g., operational state 350) until the pressure of pressurized fluid 306 goes up to 8200 PSI but also hose restraint device 100 may hold onto hose 302 and fitting 304 even upon failure of the connection thereof when the pressure of pressurized fluid 306 exceeds 8200 PSI.

FIG. 5 shows a process flow diagram detailing the operations involved in coupling a hose restraint device (e.g., hose restraint device 100) to a hose (e.g., hose 302) carrying a pressurized fluid (e.g., pressurized fluid 306) and a fitting (e.g., fitting 304) thereof, according to one or more embodiments. In one or more embodiments, operation 502 may involve providing a first button (e.g., button $104_1$) and a second button (e.g., button $104_2$) at a first end (e.g., end $106_1$) and a second end (e.g., end $106_2$) respectively of a cable (e.g., cable 102) of the hose restraint device. In one or more embodiments, operation 504 may involve providing the hose restraint device with a first link component (e.g., link component $108_1$) and a second link component (e.g., link component $108_2$), each of which includes a slot (e.g., slot 110) through which the cable passes and a notched slot (e.g., notched slot 112). In one or more embodiments, the notched slot may include another slot (e.g., slot 118) and a notch (e.g., notch 120).

In a state of operation (e.g., operational state 350) of the hose in which the hose is continually connected to the fitting and carries the pressurized fluid, several operations pertaining to the hose restraint device may be performed; the operations following this may constitute some of the aforementioned several operations. In one or more embodiments, operation 506 may involve, based on compressing a spring (e.g., spring 116) provided between the first link component and the second link component, bending the cable of the hose restraint device proximate the first end thereof around the hose, and bending the cable of the hose restraint device proximate the second end thereof over the fitting.

In one or more embodiments, operation 508 may involve anchoring the cable proximate the first end bent around the hose and the cable proximate the second end bent around the fitting to the first link component and the second link component respectively based on inserting the corresponding first button and the second button completely into the corresponding another slot of the notched slot thereof such that a first portion of the cable proximate the first button at the first end and a second portion of the cable proximate the second button at the second end automatically move into the corresponding notch of the notched slot of the first link component and the second link component respectively. In one or more embodiments, operation 510 may then involve forming a first loop-based connection (e.g., loop-based connection $200_1$) of the hose restraint device around the hose proximate the first end of the cable and a second loop-based connection (e.g., loop-based connection $200_2$) of the hose restraint device around the fitting proximate the second end of the cable based on the anchoring of the cable proximate the first end thereof and the second end thereof to the corresponding first link component and the second link component in accordance with a restoring force of the spring expanding the spring such that the spring is then solely delimited by the first link component and the second link component of the hose restraint device.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a coupling a hose restraint device to a hose carrying a pressurized fluid and a fitting thereof, comprising:

providing a first button and a second button at a first end and a second end respectively of a cable of the hose restraint device;

providing the hose restraint device with a first link component and a second link component, each of which comprises a slot through which the cable passes and a notched slot, and the notched slot comprising another slot and a notch; and in a state of operation of the hose in which the hose is continually connected to the fitting and carries the pressurized fluid, based on compressing a spring provided between the first link component and the second link component:

bending the cable of the hose restraint device proximate the first end thereof around the hose; and bending the cable of the hose restraint device proximate the second end thereof over the fitting;

anchoring the cable proximate the first end bent around the hose and the cable proximate the second end bent around the fitting to the first link component and the second link component respectively based on inserting the corresponding first button and the second button completely into the corresponding another slot of the notched slot thereof such that a first portion of the cable proximate the first button at the first end and a second portion of the cable proximate the second button at the second end automatically move into the corresponding notch of the notched slot of the first link component and the second link component respectively; and forming a first loop-based connection of the hose restraint device around the hose proximate the first end of the cable and a second loop-based connection of the hose restraint device around the fitting proximate the second end of the cable based on the anchoring of the cable proximate the first end thereof and the second end thereof to the corresponding first link component and the second link component in accordance with a restoring force of the spring expanding the spring such that the spring is then solely delimited by the first link component and the second link component of the hose restraint device.

2. The method of claim 1, comprising the first button and the second button each having a cross-sectional dimension more than that of the cable of the hose restraint device.

3. The method of claim 1, comprising:

the slot of the first link component and the second link component having a cross-sectional dimension more than that of the cable of the hose restraint device;

the another slot of the notched slot of the first link component and the second link component having a cross-sectional dimension more than that of the corresponding first button and the second button; and the notch of the notched slot of the first link component and the second link component having a width less than the cross-sectional dimension of the corresponding first button and the second button and more than the cross-sectional dimension of the cable of the hose restraint device.

4. The method of claim 1, comprising at least one of: the cable, the first button, the second button, the first link component, the second link component and the spring being made of a metallic material.

5. The method of claim 1, further comprising providing a sleeve in the slot of the first link component and the second link component such that the cable of the hose restraint device passes through the sleeve.

6. The method of claim 5, comprising the sleeve being a polyester sleeve.

7. The method of claim 1, comprising designing the hose restraint device in accordance with a minimum load thereof offered to the pressurized fluid carried by the hose obtained from a force of the pressurized fluid coming out of the hose, a cross-sectional area of the hose and a pressure of the pressurized fluid.

8. A hose restraint device couplable to a hose carrying a pressurized fluid and a fitting thereof, comprising:

a cable;

a first button and a second button at a first end and a second end respectively of the cable;

a first link component and a second link component, each of which comprises a slot through which the cable passes and a notched slot, and the notched slot comprising another slot and a notch; and a spring provided between the first link component and the second link component, wherein, in a state of operation of the hose in which the hose is continually connected to the fitting and carries the pressurized fluid, the spring is compressed to bend the cable proximate the first end around the hose and the cable proximate the second end around the fitting, the cable proximate the first end bent around the hose and the cable proximate the second end bent around the fitting are anchored to the first link component and the second link component respectively based on inserting the corresponding first button and the second button completely into the corresponding another slot of the notched slot thereof such that a first portion of the bent cable proximate the first button at the first end and a second portion of the bent cable proximate the second button at the second end automatically move into the corresponding notch of the notched slot of the first link component and the second link component respectively, and a first loop-based connection around the hose proximate the first end of the cable and a second loop-based connection around the fitting proximate the second end of the cable are formed based on the anchoring of the bent cable proximate the first end and the second end to the corresponding first link component and the second link component in accordance with a restoring force of the spring expanding the spring such that the spring is then solely delimited by the first link component and the second link component.

9. The hose restraint device of claim 8, wherein the first button and the second button each has a cross-sectional dimension more than that of the cable.

10. The hose restraint device of claim 8, wherein:
the slot of the first link component and the second link component has a cross-sectional dimension more than that of the cable,
the another slot of the notched slot of the first link component and the second link component has a cross-sectional dimension more than that of the corresponding first button and the second button, and
the notch of the notched slot of the first link component and the second link component has a width less than the cross-sectional dimension of the corresponding first button and the second button and more than the cross-sectional dimension of the cable.

11. The hose restraint device of claim 8, wherein at least one of: the cable, the first button, the second button, the first link component, the second link component and the spring is made of a metallic material.

12. The hose restraint device of claim 8, wherein the slot of the first link component and the second link component comprises a sleeve therein such that the cable passes through the sleeve.

13. The hose restraint device of claim 12, wherein the sleeve is a polyester sleeve.

14. A hose restraint system comprising:
a hose carrying a pressurized fluid;
a fitting of the hose; and
a hose restraint device comprising:
a cable;
a first button and a second button at a first end and a second end respectively of the cable;
a first link component and a second link component, each of which comprises a slot through which the cable passes and a notched slot, and the notched slot comprising another slot and a notch; and
a spring provided between the first link component and the second link component,
wherein, in a state of operation of the hose in which the hose is continually connected to the fitting and carries the pressurized fluid,
the spring of the hose restraint device is compressed to bend the cable proximate the first end around the hose and the cable proximate the second end around the fitting,
the cable proximate the first end bent around the hose and the cable proximate the second end bent around the fitting are anchored to the first link component and the second link component respectively based on inserting the first button and the second button completely into the corresponding another slot of the notched slot thereof such that a first portion of the bent cable proximate the first button at the first end and a second portion of the bent cable proximate the second button at the second end automatically move into the corresponding notch of the notched slot of the first link component and the second link component respectively, and
a first loop-based connection proximate the first end of the cable and a second loop-based connection proximate the second end of the cable are formed based on the anchoring of the bent cable proximate the first end and the second end to the corresponding first link component and the second link component in accordance with a restoring force of the spring expanding the spring such that the spring is then solely delimited by the first link component and the second link component of the hose restraint device.

15. The hose restraint system of claim 14, wherein the first button and the second button of the hose restraint device each has a cross-sectional dimension more than that of the cable.

16. The hose restraint system of claim 14, wherein:
the slot of the first link component and the second link component of the hose restraint device has a cross-sectional dimension more than that of the cable thereof,
the another slot of the notched slot of the first link component and the second link component of the hose restraint device has a cross-sectional dimension more than that of the corresponding first button and the second button of the hose restraint device, and
the notch of the notched slot of the first link component and the second link component of the hose restraint device has a width less than the cross-sectional dimension of the corresponding first button and the second button and more than the cross-sectional dimension of the cable of the hose restraint device.

17. The hose restraint system of claim 14, wherein at least one of: the cable, the first button, the second button, the first link component, the second link component and the spring of the hose restraint device is made of a metallic material.

18. The hose restraint system of claim 14, wherein the slot of the first link component and the second link component of the hose restraint device comprises a sleeve therein such that the cable of the hose restraint device passes through the sleeve.

19. The hose restraint system of claim 18, wherein the sleeve is a polyester sleeve.

20. The hose restraint system of claim 14, wherein the hose restraint device is designed in accordance with a minimum load thereof offered to the pressurized fluid carried by the hose obtained from a force of the pressurized fluid coming out of the hose, a cross-sectional area of the hose and a pressure of the pressurized fluid.

*    *    *    *    *